United States Patent [19]
Proksa et al.

[11] Patent Number: 5,264,167
[45] Date of Patent: Nov. 23, 1993

[54] PROCESS AND APPARATUS FOR CONTINUOUSLY MANUFACTURING SANDWICH ELEMENTS

[75] Inventors: Ferdinand Proksa, Leverkusen; Hans-Michael Sulzbach, Königswinter; Hans Klonk, Bonn; Reiner Raffel, Siegburg, all of Fed. Rep. of Germany

[73] Assignee: Maschinenfabrik Hennecke GmbH, Leverkusen, Fed. Rep. of Germany

[21] Appl. No.: 766,485

[22] Filed: Sep. 25, 1991

[30] Foreign Application Priority Data

Oct. 3, 1990 [DE] Fed. Rep. of Germany ....... 4031145

[51] Int. Cl.$^5$ .............................................. B29C 67/22
[52] U.S. Cl. .................... 264/46.2; 264/46.5; 264/145; 264/160; 83/26
[58] Field of Search ............ 264/46.5, 46.2, 145, 264/157, 160; 83/23, 26; 270/52.5

[56] References Cited

U.S. PATENT DOCUMENTS

| | | | |
|---|---|---|---|
| 3,165,017 | 1/1965 | Galabert | 83/7 |
| 3,240,846 | 3/1966 | Voelker | 264/46.2 |
| 4,207,667 | 6/1990 | D'Angelo et al. | 83/23 |
| 4,341,334 | 7/1982 | Bier | 83/26 |
| 4,577,789 | 3/1986 | Hofmann et al. | 270/52.5 |
| 4,581,186 | 4/1986 | Larson | 264/46.5 |
| 4,600,637 | 7/1986 | Kafka et al. | 264/145 |
| 4,727,784 | 1/1988 | Sarka et al. | 83/26 |
| 4,984,615 | 1/1991 | Terwel | 83/875 |

FOREIGN PATENT DOCUMENTS

| | | |
|---|---|---|
| 004193 | 9/1979 | European Pat. Off. . |
| 3806070 | 9/1989 | Fed. Rep. of Germany . |
| 3284578 | 12/1991 | Japan . |
| 8804589 | 6/1988 | World Int. Prop. O. . |

Primary Examiner—Allan R. Kuhns
Attorney, Agent, or Firm—Joseph C. Gil

[57] ABSTRACT

In order to guarantee substantially trouble-free operation when manufacturing sandwich elements on a double conveyor belt installation having a downstream cross cutter and cleaning device, the cleaning device disposed on a transport carriage i) is returned to the carriage of the cross cutter to pick up the next sandwich element, is braked and is then re-accelerated to a speed higher than the production speed, ii) is, after reaching a desired distance.

3 Claims, 2 Drawing Sheets

PROCESS AND APPARATUS FOR CONTINUOUSLY MANUFACTURING SANDWICH ELEMENTS

BACKGROUND OF THE INVENTION

The present invention relates to a process and apparatus for continuously manufacturing sandwich elements. The sandwich elements have a foam material core between two facing sheets or panels. In the process, a foam-producing reaction mixture is allowed to expand between the two facing sheets and cure to form the foam material core. A sandwich element of the desired length is then cut from the continuous sandwich thus formed by a cross cutter disposed on a carriage travelling along at the feed rate of the sandwich. After being cut away, the sandwich element is accelerated by means of a transport carriage, with a cleaning brush being passed through the gap thus formed before the sandwich element is transported away.

It is known to use a cleaning device disposed downstream of the cross cutter on a movable transport carriage to remove from the sandwich elements any cutting dust and, where the facings are metallic, any burr arising during cutting (see German patent 3,806,070). This type of construction is very expensive. In addition, problems are posed by the repeated gripping of the sandwich elements cut into lengths. Pile-ups can occur because it is not always possible to coordinate the travelling speed of the carriage of the cleaning device precisely with the feed rate of the sandwich. If a sandwich element tilts when clamped in the cleaning device, this may sometimes lead to undesirable loading of the saw blade of the cross cutter and hence to a diagonal cut.

An object of the present invention is to provide a process and an apparatus for manufacturing sandwich elements, which guarantee substantially trouble-free production even when a cleaning process is provided downstream.

DESCRIPTION OF THE INVENTION

Figure 1:
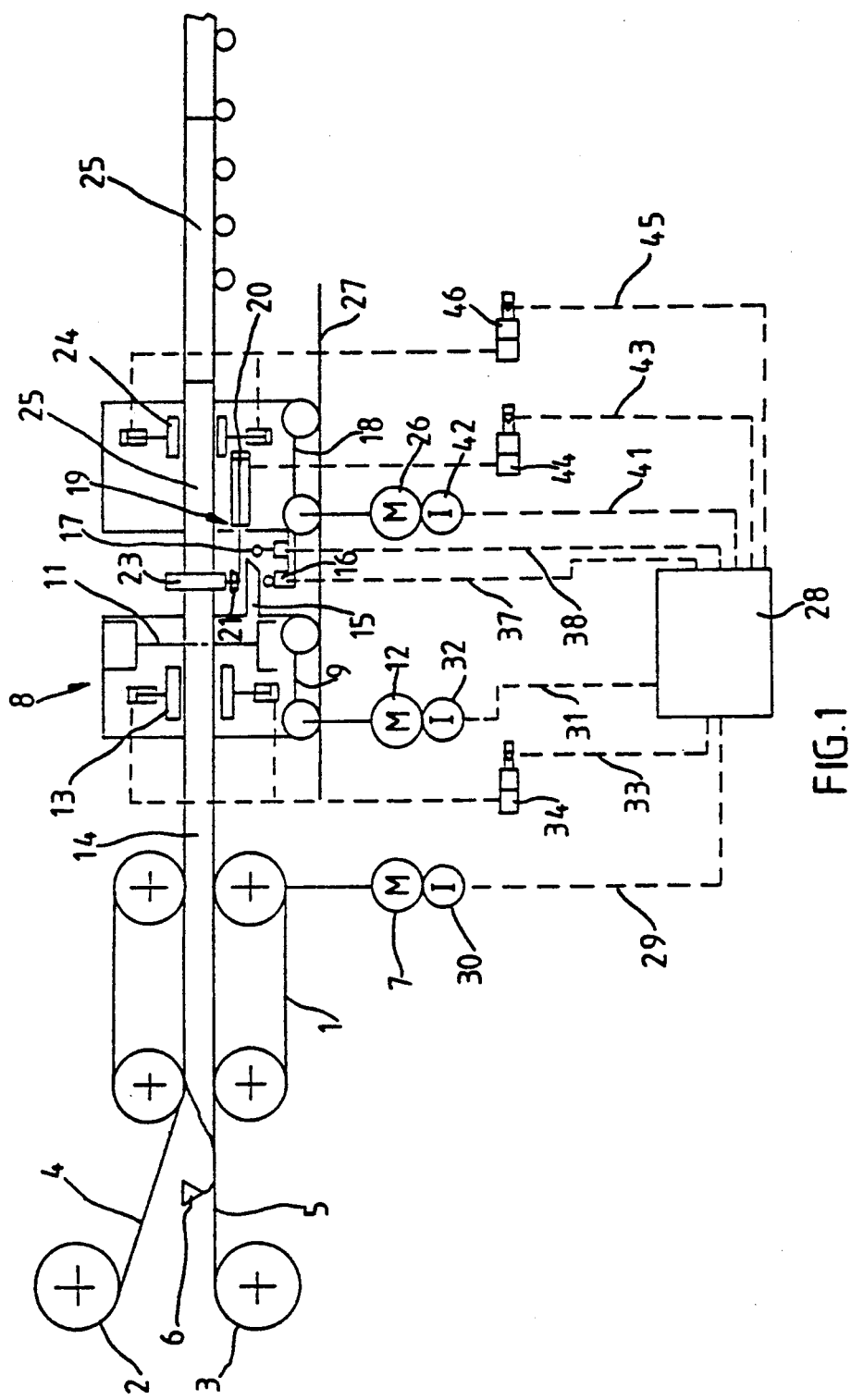
FIG. 1 is a side view of an apparatus according to the present invention.

The above object is achieved by following several specific steps. After the cleaning process, the transport carriage is returned to the carriage of the cross cutter to pick up the next sandwich element, is braked there and is then re-accelerated in the production direction. The transport carriage is moved at a speed which is slightly higher than the feed rate of the uncut sandwich until it has reached a desired distance from the carriage of the cross cutter, when it is moved on at the feed rate of the uncut sandwich. After the sandwich element has been cut to length and to form the gap necessary for the cleaning process, the transport carriage is accelerated once more.

By these means it is possible to move the carriage of the cross cutter and the transport carriage of the cleaning device smoothly into a position such that they assume and maintain a desired distance, as the run travels in the production direction, until the transport carriage is once more accelerated to form the gap through which the cleaning brush is passed. The desired distance should be large enough to eliminate the risk of contact with the end of the sandwich run even in the event of tilting of the sandwich element. In adjusting the desired distance, the transport carriage slides up under the end of the run. The cleaning brushes may be fibrous brushes, or alternatively air brushes, by means of which the surfaces may be dusted off. A suction device may be associated with the cleaning device as well as with the cross cutter.

For the cleaning process, the sandwich element is preferably fixed on the transport carriage, after having been cut to length. Fixing of the sandwich element is especially advantageous when the element is light in weight and could easily shift during cleaning.

According to a further special embodiment, during the renewed acceleration of the transport carriage, the cleaning brush is moved into position for engagement into the gap being formed. This measure is always necessary if there is insufficient room laterally of the installation, i.e. if, when the transport carriage is moved up, there is no room for the cleaning brush in the same transverse plane as the cross cutter.

The new installation for continuously manufacturing sandwich elements broadly comprises:

i) a double conveyor belt having a feed device for a foam-producing reaction mixture as well as feeding means for facings;

ii) a first carriage with a cross cutter downstream of the double conveyor belt and movable in the production direction iii) a transport carriage downstream of said first carriage, said transport carriage having a cleaning device with a brush which is movable in the production direction, and, iv) a controlling and regulating means connected to the cross cutter and said first carriage and with the transport carriage, said means controlling and regulating the movement of said cross cutter, said first carriage, said transport carriage and said cleaning device.

The key feature of the present invention is that the first carriage has a switch rod which cooperates with two proximity switches disposed one behind the other on the transport carriage and connected by the control and regulating means to the travelling mechanism of the transport carriage, with the first proximity switch closest to the switch rod being used to brake the transport carriage and the second proximity switch being used to accelerate the transport carriage in the production direction at a speed slightly higher than the feed rate of the sandwich run. In addition, upon re-release of the second proximity switch by the switch rod, the second proximity switch is used to continue to advance the transport carriage at a speed corresponding to the production speed of the sandwich run in order to adjust a constant distance between the transport carriage and the first carriage by means of the control and regulating unit.

The switch rod and the first proximity switch prevent the transport carriage, when it is returned, from coming into contact with the first carriage and possibly disrupting the cutting process.

If the transport carriage is equipped in a known manner with a clamping device for fixing the sandwich element in position, the clamping device is triggerable by the opening of a second clamping device associated with the cross cutter. This ensures that both clamping devices are not actuated by the control and regulating means until the separating cut of the cross cutter is completed.

According to a further special embodiment, the cleaning device comprises a longitudinally operating cylinder which is movable counter to the production direction and carries a transversely operating cylinder having a cleaning brush. The longitudinally operating cylinder allows the transversely operating cylinder and cleaning brush only to be moved into position when neither can collide with the cross cutter.

An embodiment of the new installation is illustrated purely diagrammatically and in a simplified manner in the drawings and is described in greater detail hereinafter.

The installation comprises a double conveyor belt 1 having feed stations 2 and 3 for a top facing 4 and a bottom facing 5, as well as a feed device 6 for a liquid, foam-producing polyurethane reaction mixture. The double conveyor belt 1 has an associated electric drive mechanism 7 and a downstream cross cutter 8. The cross cutter is mounted on a first carriage 9 and has a saw device 11 equipped with a hydraulic operating cylinder 10. The carriage 9 also has an electric travelling mechanism 12 and carries a clamping device 13 for gripping the sandwich run 14 produced. The carriage 9 also has a switch rod 15 which cooperates with successively arranged proximity switches 16 and 17 of a transport carriage 18 for a cleaning device 19. The cleaning device 19 has a longitudinally operating cylinder 20 for displacing a transversely arranged carrier 21 counter to the production direction of the installation. Disposed on said carrier 21 is a transversely operating cylinder 22 which may move a cleaning brush 23 transversely to the production direction. A clamping device 24 for gripping the cut-to-length sandwich elements 25 is also disposed on the transport carriage 18. The transport carriage 18 is equipped with an electric travelling mechanism 26. Carriage 9 and transport carriage 18 are movable along a rail track 27.

Figure 2:
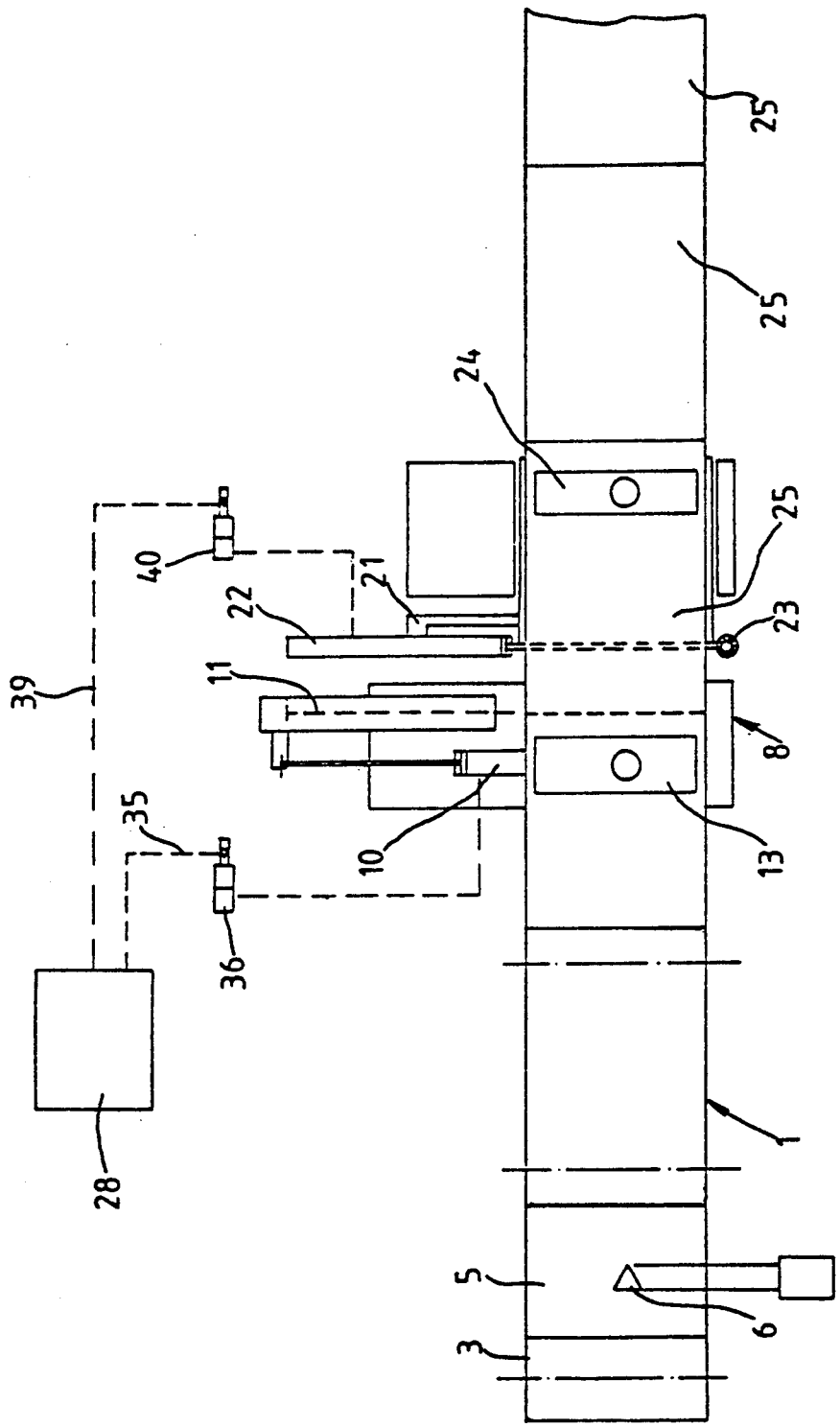
FIG. 2 is a plan view of an apparatus according to the present invention.

A control and regulating unit 28 is associated with the installation. The unit is connected as follows: by a pulse line 29 and an incremental encoder 30 to the drive mechanism 7 of the double conveyor belt 1; by a pulse line 31 and an incremental encoder 32 to the travelling mechanism 12 of the first carriage 9; by a pulse line 33 and a valve 34 to the clamping device 13; by a pulse line 35 and a valve 36 to the operating cylinder 10 of the saw device 11 (FIG.2); by pulse lines 37 and 38 to the proximity switches 16 and 17; by a pulse line 39 and a valve 40 (FIG.2) to the transversely operating cylinder 22 of the cleaning brush 23; by a pulse line 41 and an incremental encoder 42 to the travelling mechanism 26 of the transport carriage 18; by a pulse line 43 and a valve 44 to the longitudinally operating cylinder 20 of the cleaning device 19; and by a pulse line 45 and a valve 46 to the clamping device 24 of the transport carriage 18.

The mode of operation of the device is as follows. Facings 4 and 5 are fed into the double conveyor belt 1 from the feed stations 2 and 3, with a reaction mixture producing rigid expanded polyurethane being fed onto the bottom facing 5 by means of the feed device 6. Pulse increments are supplied from the drive mechanism 7 of the double conveyor belt I and from the associated incremental encoder 30 by way of the pulse line 29 to the control and regulating unit 28. There, the pulses are compared with those supplied by the incremental encoder 32 of the travelling mechanism 12 of the carriage 9. If synchronous, the clamping device 13 is triggered by the control and regulating unit 28 by way of the pulse line 33 and the valve 34, with the result that the sandwich run 14 is clamped. This avoids vibrations and lateral shifting during cutting. The operating cylinder 10 then receives a command from the control and regulating unit 28 by way of the pulse line 35 to actuate the saw device 11. Once the cut is completed, the clamping device 13 of the operating cylinder 10 receives the command to open by way of the control and regulating unit 28. During the cutting process, the transport carriage 18 is returned counter to production direction and moves with the proximity switch 16 towards the switch rod 15. The transport carriage 18 is consequently braked and stopped without touching the carriage 9. The braking is effected in that a pulse is supplied by the proximity switch 16 by way of the pulse line 37 to the control unit 28, and the motor 26 of the transport carriage 18 is braked and stopped by said control and regulating unit 28 by way of the pulse line 41. While the transport carriage 18 is stationary, the carriage 9 continues to travel. As soon as its switch rod 15 triggers the proximity switch 17, a pulse passes by way of the pulse line 38 to the control and regulating unit 28, which in turn supplies a pulse by way of the pulse line 41 and the incremental encoder 42 to the motor 26, which then accelerates the transport carriage 18 to a speed slightly higher than the production speed of the double conveyor belt 1. In other words, the transport carriage 18 then moves slowly further away from the carriage 9. As soon as the proximity switch 17 is re-released by the switch rod 15, there is a changeover to synchronous speed between the production speed and the transport carriage 18.

After the cut is completed, with opening of the clamping device 13, the clamping device 24 receives the command from the control and regulating unit 28 by way of the pulse line 45 and the valve 46 to clamp the sandwich element 25 which has been cut to length. The carriage 9 then travels counter to production direction back into its starting position. The transport carriage 18 is then moved at a higher speed than the production speed, with the result that a gap arises between the end of the sandwich run 14 and the sandwich element 25 which has been cut to length. This command is also passed by the control and regulating unit to the travelling mechanism 26. Meanwhile, the longitudinally operating cylinder 20 is actuated by way of the pulse line 43 and the valve 44, so that the transversely operating cylinder 22 is moved to the level of the gap formed. In its end position, the longitudinally operating cylinder 20 sends back a signal, as a result of which the transversely operating cylinder 22 receives a command from the control and regulating unit 28 by way of the pulse line 39 and the valve 40 to move the cleaning brush 23 through the gap. When the transversely operating cylinder 22 signals completion of the cleaning process, the clamping device 24 receives the command to open from the control and regulating unit 28 and the longitudinally operating cylinder 20 also receives the command to return to its starting position. Finally, the travelling mechanism 26 also receives the signal to move the transport carriage counter to the production direction towards the carriage 9 and into its starting position so that the next cycle can occur.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for continuously manufacturing sandwich elements having a foam core between two facings, comprising:
   i) continuously advancing a top facing and a bottom facing in the same direction,
   ii) introducing a foam-producing reaction mixture between said top and bottom facings, and allowing said mixture to expand between said facings and to cure to thereby produce a continuous sandwich run,
   iii) cutting said continuous run to form a sandwich element of a desired length by means of a cross cutter carried on a first carriage which travels along at the same rate as the sandwich run,
   iv) accelerating said sandwich element away from said continuous run to form a gap between said continuous run and said sandwich element, said acceleration being performed by a transport carriage, and
   v) passing a cleaning brush through said gap before the sandwich element is transported away, the improvement wherein after the passing of said cleaning brush through said gap, said transport carriage is returned to the first carriage to pick up the next sandwich element which as been cut to length, is braked there and is then re-accelerated in the production direction to a speed which is slightly higher than the rate of the sandwich run until it has reached a desired distance from the first carriage, whereupon it is moved on at the same rate as the sandwich run.

2. The process of claim 1, wherein the sandwich element is fixed on the transport carriage after having been cut to length.

3. The process of claim 1, wherein during the reacceleration of the transport carriage, the cleaning brush is moved into position for engagement into the gap being formed.

* * * * *